(12) United States Patent
Beyfuss et al.

(10) Patent No.: US 8,864,243 B2
(45) Date of Patent: Oct. 21, 2014

(54) WHEEL BEARING UNIT AND METHOD FOR PRODUCING THE SAME

(75) Inventors: Berthold Beyfuss, Kaisten (DE); Alfred Radina, Poppenlauer (DE); Jonas Schierling, Hassfurt (DE); Hans-Juergen Friedrich, Koenigsberg (DE); Fred Fuchs, Schweinfurt (DE); Armin Olschewski, Schweinfurt (DE); Carl Vissers, Den Dungen (NL)

(73) Assignee: Aktiebolaget SKF, Gothenburg (SE)

( * ) Notice: Subject to any disclaimer, the term of this patent is extended or adjusted under 35 U.S.C. 154(b) by 364 days.

(21) Appl. No.: 13/320,854

(22) PCT Filed: May 18, 2009

(86) PCT No.: PCT/EP2009/003511
§ 371 (c)(1),
(2), (4) Date: Jan. 27, 2012

(87) PCT Pub. No.: WO2010/133233
PCT Pub. Date: Nov. 25, 2010

(65) Prior Publication Data
US 2012/0112521 A1   May 10, 2012

(51) Int. Cl.
  *B60B 27/02*   (2006.01)
  *F16C 33/58*   (2006.01)
  *F16C 19/18*   (2006.01)
  *F16C 35/067*  (2006.01)

(52) U.S. Cl.
  CPC .............. *B06B 27/02* (2013.01); *F16C 33/588* (2013.01); *F16C 19/184* (2013.01); *F16C 35/067* (2013.01); *F16C 2326/02* (2013.01)
  USPC .......................................... 301/110; 384/544

(58) Field of Classification Search
  CPC ...... B60B 27/02; B60B 27/0005; B60B 35/18
  USPC ........................ 301/105.1, 109, 110; 384/544; 29/894.631, 89.632
  See application file for complete search history.

(56) References Cited

U.S. PATENT DOCUMENTS

| 3,757,883 | A  | * | 9/1973 | Asberg ............................ 180/370 |
| 2003/0077016 | A1 | * | 4/2003 | Iarrera et al. .................... 384/537 |
| 2009/0108667 | A1 | * | 4/2009 | Clark et al. ................. 301/105.1 |
| 2010/0038958 | A1 | * | 2/2010 | Tsuzaki et al. ................. 301/125 |

FOREIGN PATENT DOCUMENTS

| DE | 3721737 A1 | * | 1/1989 |
| DE | 10123683 A1 | | 11/2002 |

(Continued)

*Primary Examiner* — Kip T Kotter
(74) *Attorney, Agent, or Firm* — Bryan Peckjian; SKF USA Inc. Patent Department

(57) ABSTRACT

The invention relates to a wheel bearing unit (1) for a vehicle wheel, comprising a hub element (2, 3, 2') which has an axially (a) extending cylindrical section (4) to be supported by a bearing arrangement (5) and which has a radially (r) extending flange section (6) for fixing the vehicle wheel and/or a brake disk at a face side (7) of the flange section (6), wherein the bearing arrangement (5) has an outer ring (8). To ensure a firm and cost effective axial connection between the hub element and the outer ring, the invention is characterized in that the outer ring (8) has a radially extending insection (9) at its a outer circumference (10), wherein the axially (a) extending cylindrical section (4) of the hub element (2, 3, 2') is deformed partially (11) so that a section of it interferes in the insection (9) for axially fixing the hub element (2, 3, 2') relatively to the outer ring (8). The invention also relates to a method for producing a wheel bearing unit.

16 Claims, 3 Drawing Sheets

(56) References Cited

FOREIGN PATENT DOCUMENTS

| | | | |
|---|---|---|---|
| DE | 102004018900 A1 | 11/2005 | |
| JP | 2008162450 A | 7/2008 | |
| WO | WO2005008085 A1 | 1/2005 | |
| WO | WO2008000283 A1 | 1/2008 | |

\* cited by examiner

WHEEL BEARING UNIT AND METHOD FOR PRODUCING THE SAME

TECHNICAL FIELD

The invention relates to a wheel bearing unit for a vehicle wheel, comprising a hub element which has an axially extending cylindrical section to be supported by a bearing arrangement and which has a radially extending flange section for fixing the vehicle wheel and/or a brake disk at a face side of the flange section, wherein the bearing arrangement has an outer ring. The invention also relates to a method for producing a wheel bearing unit.

BACKGROUND

A wheel bearing unit of this kind is shown for example in WO 2008/000283 A1. Here a cylindrical sleeve element forms a part of the wheel bearing unit and is supported by a two-row angular contact ball bearing. Radially extending flange elements are formed at the cylindrical sleeve element to support a brake disk which can thus be fixed at the hub element. A vehicle wheel is then mounted by attaching it at one of the face sides of the brake disk.

This previously known design of a wheel bearing unit is quite complex and is expensive to produce.

SUMMARY OF THE INVENTION

According to the invention, a design for a wheel bearing unit is suggested, which is suitable to support a brake disk and/or a vehicle wheel. The wheel bearing unit comprises a hub element which has an axially extending cylindrical section, which is arranged to be supported by a bearing arrangement. Furthermore, the hub element has a radially extending flange section for fixing the vehicle wheel and/or the brake disk at a face side of the flange section.

It is an object of the invention to propose a design of such a wheel bearing unit which allows an easy and cost effective production and assembly of the parts. Especially, the required parts should be producible in an inexpensive manner. Finally, is should be guaranteed that the axial connection between the axially extending cylindrical section and the bearing outer ring is able to transmit high axial forces, i.e. the fixation between the cylindrical section and the outer ring should be stable and enduring.

A solution according to the invention is characterized in that the outer ring has a radially extending insection at its outer circumference, wherein the axially extending cylindrical section of the hub element is deformed partially so that a section of it interferes in the insection for axially fixing the hub element relatively to the outer ring.

The insection in the outer ring extends preferably groove-like along the whole circumference of the outer ring.

The outer ring can be made as a single piece and can comprise two raceways for two rows of rolling element. In this case the insection can be arranged axially between the two raceways.

The outer ring can have a coupling element at one of its axial ends. Preferably, the coupling element is a spline machined in the axial end of the outer ring.

The hub element can have a plurality of connection means in the radially extending flange section for fixing the vehicle wheel. Those connection means can be through bore-holes or threaded holes.

According to one embodiment of the invention the hub element can be a single-piece part.

It is also possible that the hub element consists of at least two parts which are connected by connection means; those connection means can be bolts or rivets or a welding seam.

The bearing arrangement is preferably a two row annular contact ball bearing with one outer ring and two inner rings.

The hub element and its parts and/or the outer ring consist preferably of sheet metal.

The hub element can have a radially extending section forming an axial stop for the outer ring; alternatively the outer ring can have a radially extending section forming an axial stop for the hub element.

The outer ring of the bearing arrangement can rotate relatively to at least one inner ring, wherein the at least one inner ring is then arranged stationary.

The method for producing a wheel bearing unit for a vehicle wheel, wherein the wheel bearing unit comprises a hub element which has an axially extending cylindrical section to be supported by a bearing arrangement and which has a radially extending flange section for fixing the vehicle wheel and/or a brake disk at a face side of the flange section, wherein the bearing arrangement has an outer ring, is characterized in that the outer ring has a radially extending insection at its outer circumference, wherein a part of the axially extending cylindrical section of the hub element is deformed by applying a radial force to the cylindrical section so that a section of the cylindrical section interferes in the insection.

By the suggested solution is becomes easily possible to establish a firm axial fixation between the bearing outer ring and the hub element with low costs. No additional parts are necessary to firmly arrange the bearing outer ring relatively to the hub element.

Also, very beneficially one of the axial ends of the bearing outer ring stays "free", i.e. here a face spline can be machined which allows the engagement of a driving element which has a corresponding axial spline.

The invention is preferably applied for wheel bearing units which are non-driven, but a driven version can also be considered. Furthermore, bearing units with a rotating bearing outer ring are preferred.

The required parts of the hub element are preferably made of sheet metal with a thickness of between 2 and 8 mm. The sheet metal can be a low-carbon ferrous metal such as steel, or a non-ferrous metal such as aluminium. Low-carbon sheet metal is advantageous in view of its weldability and cold-formability. The sheet metal can also comprise a combination of ferrous and non-ferrous metal.

The parts can be manufactured according to known technologies.

In some embodiments, the hub element or its parts are provided with a coating to protect the parts against corrosion during service conditions. The coating may consists of a sacrificial metal, e.g. a zinc coating, to provide the parts of the hub element with cathodic protection. A passive, corrosion-preventing coating is also possible.

Preferably an overmoulding is applied to the hub element or its parts. For doing so, a non-ferrous material as well as a plastic material or a combination of these can be employed.

BRIEF DESCRIPTION OF THE DRAWING

The drawings show embodiments of the wheel bearing unit according to the invention.

DETAILED DESCRIPTION OF THE INVENTION

Figure 1:
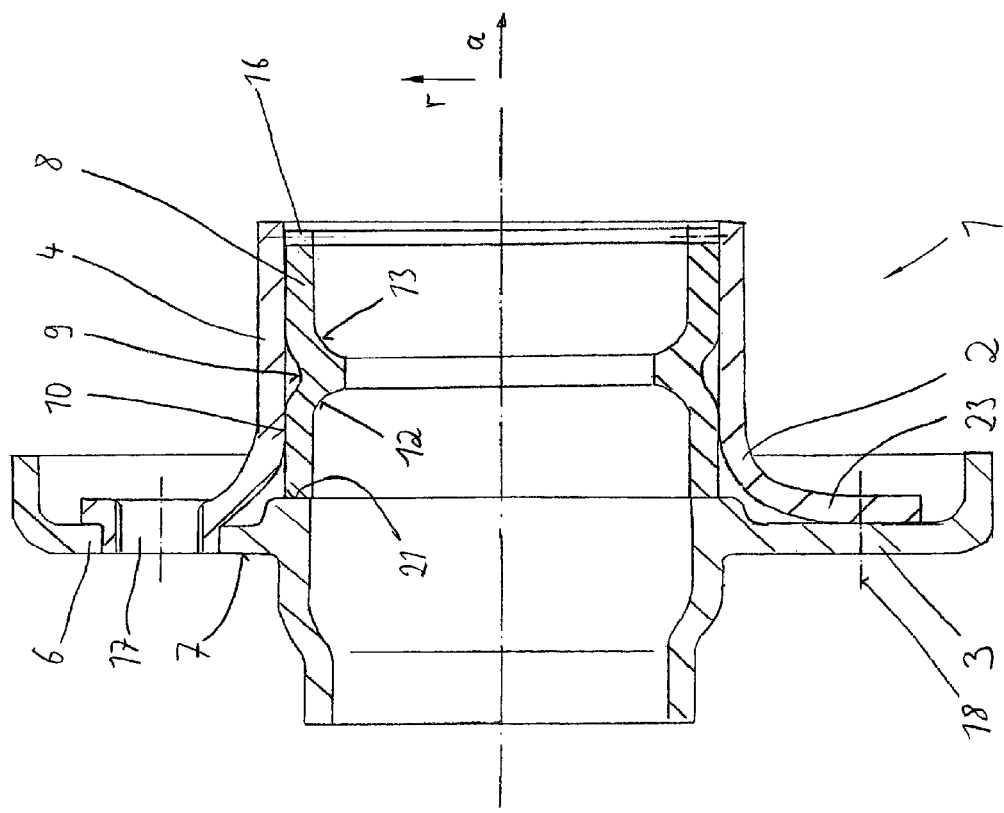
FIG. 1 shows a cross sectional view of a wheel bearing unit without brake disk and without wheel, wherein the axial fixation between a bearing outer ring and a cylindrical section of a hub element is not yet established.
Figure 2:
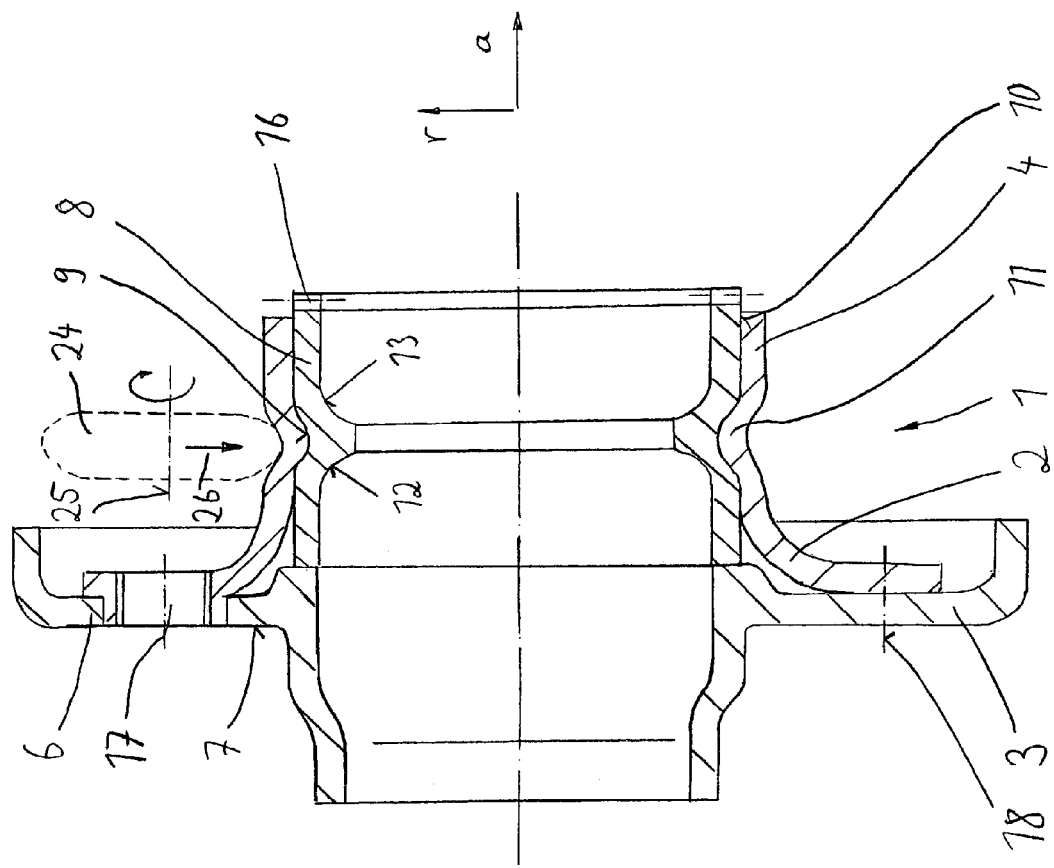
FIG. 2 shows the cross sectional view of the wheel bearing unit according to FIG. 1, wherein now the axial fixation between the bearing outer ring and the cylindrical section of the hub element is established.
Figure 3:
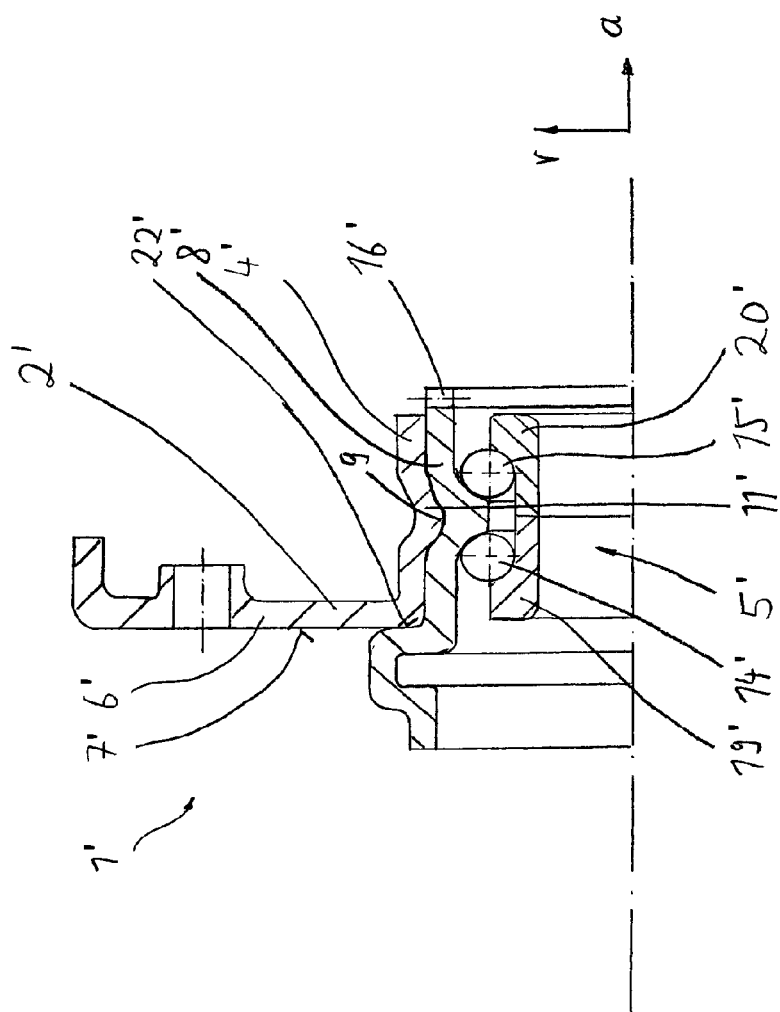
FIG. 3 shows a cross sectional view of an alternative design of a wheel bearing unit according to FIG. 1, wherein the axial fixation between the bearing outer ring and the cylindrical section of the hub element is established.

FIG. 1 and FIG. 2 show a wheel bearing unit 1 which consists of a hub element 2, 3 and a bearing arrangement from which only an outer ring 8 is shown (the rest of the bearing arrangement 5 is shown in FIG. 3). An axial fixation between the hub element 2, 3 and the outer ring 8 is not yet established in the depiction according to FIG. 1; this is the case in FIG. 2.

The hub element 2, 3 consists of two parts. A first part 2 has a cylindrical section 4, i.e. a sleeve section, as well as a radially extending portion 23. A second part 3 has a flange section 6 with a face side 7 on which a wheel and/or a braking disc (not depicted) can be mounted. For doing so connection means 17 are arranged. In the present case the connection means 17 comprise threaded holes around the circumference of the hub element 2, 3 in which bolts can be screwed to fix the wheel and/or the braking disc. As can be seen in the upper half of FIG. 1 and FIG. 2 a part of the material of the first part 2 of the hub element 2, 3 is deformed to engage into a bore in the second part 3 and more specifically in the flange section 6. This allows a sufficient hold of the bolts which are screwed into the threaded holes.

Both parts 2, 3 of the hub element are connected by connection means 18 which are shown only schematically in FIG. 1 and FIG. 2. Here, bolts or rivets can be employed to firmly connect both parts 2, 3. Also, the two parts can be connected by welding.

The bearing outer ring 8 is made as one piece and has two raceways 12 and 13 for two rows of rolling elements, which are balls in the shown application. Axially between the two raceways 12, 13 an insection 9 is machined into the outer circumference 10 of the outer ring 8 which is formed as a ring-shaped groove. The insection 9 can be made by a turning operation or by a deforming operation.

During the assembly process, at first the two parts 2, 3 of the hub element are connected by the connection means 18. Then the outer ring 8 is pushed into the cylindrical section 4 of the first part 2 until an axial stop 21 (see FIG. 1) is reached. This is the final axial end position in which the outer ring 8 is to be kept within the hub element 2, 3. This situation is shown in FIG. 1.

For axially fixing the outer ring 8 relatively to the hub element 2, 3 and more specifically to the cylindrical section 4, a part of the cylindrical section 4 is deformed. More specifically, a deformation process takes place by deforming material of the cylindrical section 4 into the insection 9 of the outer ring 8. Thus, a deformed section 11 is generated as can be seen in FIG. 2.

For doing so, a deforming tool 24 is employed as shown with dotted lines in FIG. 2. The deforming tool 24 rotates around an axis 25 and is pressed in radial direction r, wherein a force 26 (see FIG. 2) is exerted on the outer circumference of the cylindrical section 4 at that axial position where the insection 9 is arranged. So, a cold-rolling deformation of the cylindrical section 4 is carried out which can be done quickly and cost effective.

By the deformation process not only material of the cylindrical section 4 is brought at least partially into the insection 9; also this operation shortens the cylindrical section in axial direction a. As can be seen by comparing FIG. 1 with FIG. 2 the cylindrical section 4 is a bit longer in axial direction than the outer ring 8 before the deformation is carried out (see FIG. 1) but it is a bit shorter after the deformation (FIG. 2). Thus, the (right) axial end of outer ring 8 is "free" when the assembly process is finished.

This is used beneficially to apply a spline 8 (form-fitted coupling element) in one of the axial ends of the outer ring 8 for engagement with another part with a corresponding spline (not shown) so that the spline can be used for applying a drive torque to the outer ring 8 and thus to the hub element 2, 3 and consequently to the wheel, as the deformation of the section 11 not only guarantees a firm axial connection between the outer ring 8 and the hub element 2, 3 but also a firm connection in circumferential direction.

An alternative design is shown in FIG. 3. Here the hub element 2 is made as a single-part element. The outer ring 8' of the bearing arrangement 5' is fixed in the same manner as explained in connection with FIG. 1 and FIG. 2. FIG. 3 shows the status in which the cylindrical section 4' of the hub element 2' is already deformed, i.e. the deformed section 11' is already produced which interferes in the insection 9' of the outer ring 8'.

In the case of the embodiment according FIG. 3 the outer ring 8' is formed in its left region to form an axial stop 22' for the radially extending flange section 6' of the hub element 2'.

The bearing arrangement 5' consists of the outer ring 8' and two inner rings 19' and 20', wherein two rows of rolling elements 14' and 15' are arranged between the rings 8', 14', 15'.

The bearing arrangement 5' can be sealed in a known manner to obtain a wheel bearing unit with a long service life and minimal maintenance requirements. The bearing arrangement can also be provided with one more sensors, to detect operating parameters such as speed, load and/or vibration.

REFERENCE NUMERALS

1 Wheel bearing unit
2, 3, 2' Hub element
2 First part of the hub element
3 Second part of the hub element
4, 4' Cylindrical section (sleeve section)
5, 5' Bearing arrangement
6, 6' Flange section
7, 7' Face side
8, 8' Outer ring
9, 9' Insection
10 Outer circumference
11, 11' Deformed section
12 Raceway
13 Raceway
14, 14' Rolling element (ball)
15, 15' Rolling element (ball)
16, 16' Coupling element (spline)
17 Connection means (bolt)
18 Connection means (bolt, rivet)
19, 19' Inner ring
20, 20' Inner ring
21 Axial stop
22, 22' Axial stop
23 Radial extending portion
24 Deforming tool
25 Axis
26 Force a Axial direction
r Radial direction

The invention claimed is:

1. Wheel bearing unit for a vehicle wheel, comprising:
a hub element which has an axially extending cylindrical section to be supported by a bearing arrangement and which has a radially extending flange section configured to fix the vehicle wheel and/or a brake disk at a face side of the radially extending flange section,
the bearing arrangement having an outer ring,
the outer ring has a radially extending depression in an outer surface along an outer circumference thereof, wherein the axially extending cylindrical section of the hub element is deformed partially so that a section thereof is positioned in and engages the depression for axially fixing the hub element relative to the outer ring,
the axially extending section of the hub element has an axial end located on a side of the radially extending depression opposite from the radially extending flange section of the hub element, wherein the outer ring extends axially past the axial end of the hub element such that a portion of the outer surface of the outer ring is not enclosed by the hub element.

2. The wheel bearing unit according to claim 1, wherein the depression in the outer ring extends along the whole circumference of the outer ring, forming a groove therein.

3. The wheel bearing unit according to claim 1, wherein the outer ring is made as a single piece and comprises two raceways for two rows of rolling element.

4. The wheel bearing unit according to claim 3, wherein the depression is arranged axially between the two raceways.

5. The wheel bearing unit according to claim 1, wherein the outer ring has a coupling element at one of its axial ends.

6. The wheel bearing unit according to claim 5, wherein the coupling element is a spline machined in the axial end of the outer ring.

7. The wheel bearing unit according to claim 1, wherein the hub element has a plurality of connection means in the radially extending flange section for fixing the vehicle wheel.

8. The wheel bearing unit according to claim 7, wherein the connection means are through bore-holes or threaded holes.

9. The wheel bearing unit according to claim 1, wherein the hub element is a single-piece part.

10. The wheel bearing unit according to claim 1, wherein the hub element consists of at least two parts which are connected by connection means.

11. The wheel bearing unit according to claim 10, wherein the connection means are bolts or rivets or a welding seam.

12. The wheel bearing unit according to claim 1, wherein the bearing arrangement is a two row annular contact ball bearing with one outer ring and two inner rings.

13. The wheel bearing unit according to claim 1, wherein the hub element and the outer ring are formed out of sheet metal.

14. The wheel bearing unit according to claim 1, wherein the hub element has one of a radially extending section forming an axial stop for the outer ring and the outer ring has a radially extending section forming an axial stop for the hub element.

15. The wheel bearing unit according to claim 1, wherein the outer ring of the bearing arrangement can rotate relatively to at least one inner ring, and wherein the at least one inner ring is arranged stationary.

16. A Method for producing a wheel bearing unit for a vehicle wheel, comprising:
a hub element which has an axially extending cylindrical section to be supported by a bearing arrangement and which has a radially extending flange section configured to fix the vehicle wheel and/or a brake disk at a face side of the radially extending flange section,
the bearing arrangement having an outer ring,
the outer ring has a radially extending depression in an outer surface along an outer circumference thereof, wherein the axially extending cylindrical section of the hub element is deformed partially so that a section thereof is positioned in and engages the depression for axially fixing the hub element relative to the outer ring,
the axially extending section of the hub element has an axial end located on a side of the radially extending depression opposite from the radially extending flange section of the hub element, wherein the outer ring extends axially past the axial end of the hub element such that a portion of the outer surface of the outer ring is not enclosed by the hub element.

* * * * *